No. 872,462. PATENTED DEC. 3, 1907.
E. H. SCHROEDER.
GRAIN CONVEYER.
APPLICATION FILED OCT. 30, 1905.
2 SHEETS—SHEET 2.
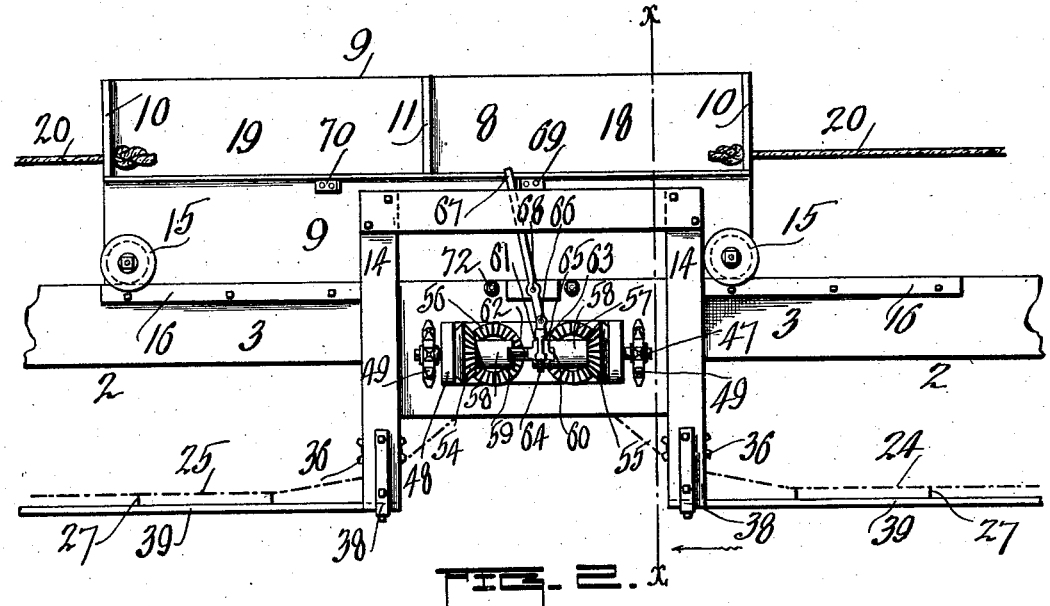
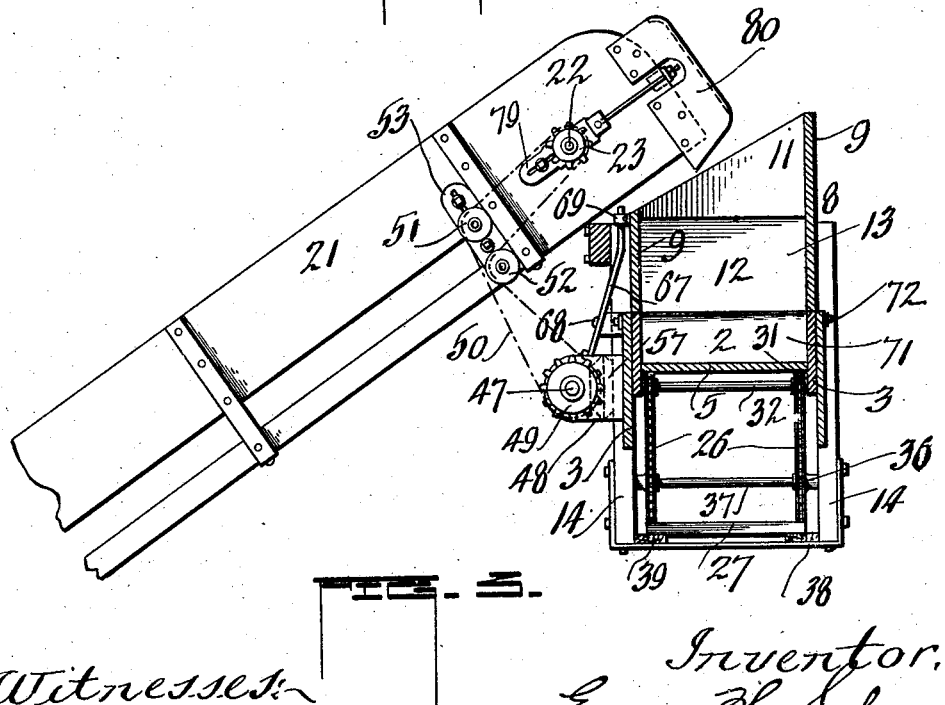
Witnesses:
H. V. Gibson
H. B. Lausey
Inventor,
Ernst H. Schroeder,
By Chas. N. La Porte
Atty.

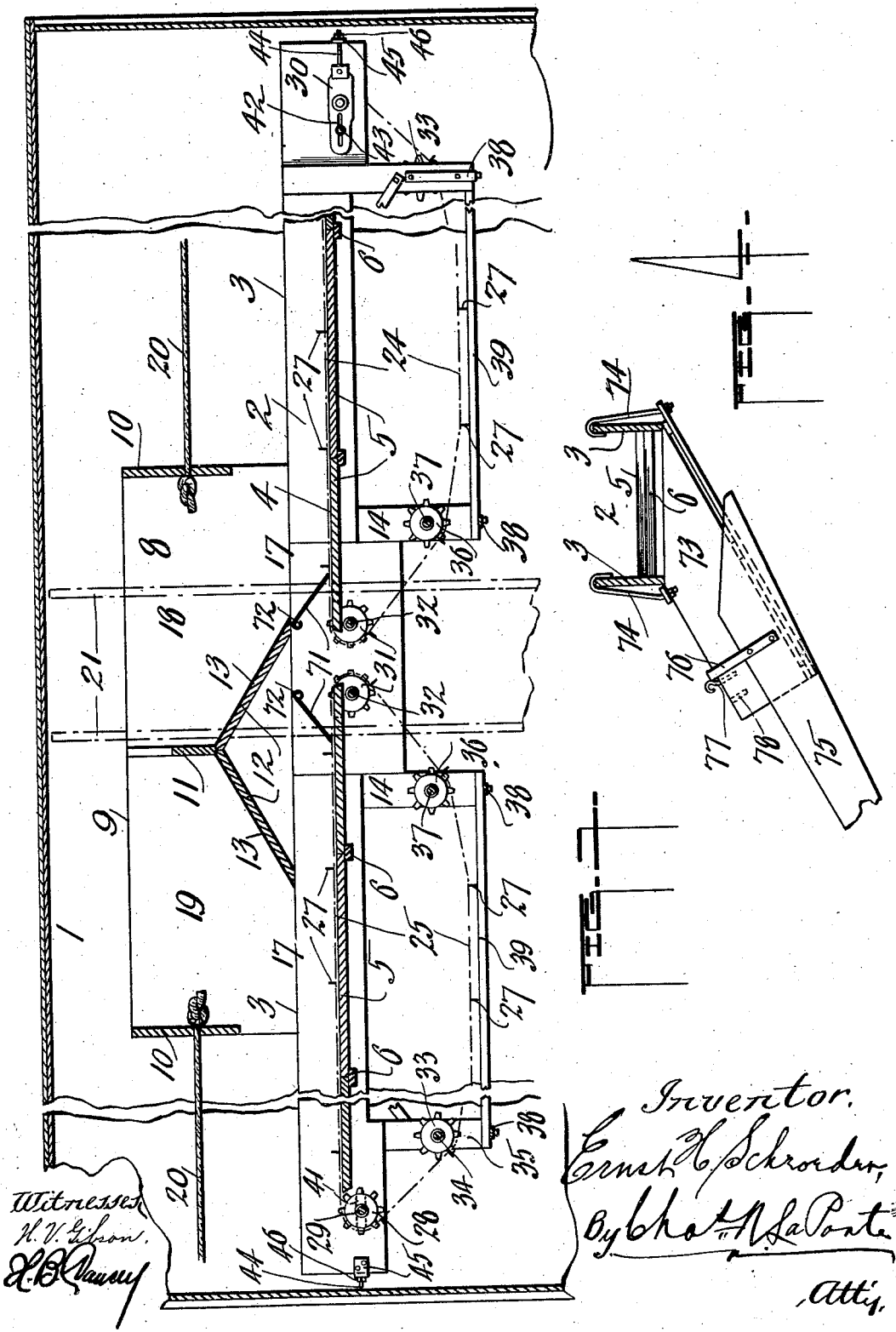

UNITED STATES PATENT OFFICE.

ERNST H. SCHROEDER, OF MINIER, ILLINOIS.

GRAIN-CONVEYER.

No. 872,462.

Specification of Letters Patent.

Patented Dec. 3, 1907.

Application filed October 30, 1905. Serial No. 285,201.

*To all whom it may concern:*

Be it known that I, ERNST H. SCHROEDER, a citizen of the United States, residing at Minier, in the county of Tazewell and State of Illinois, have invented certain new and useful Improvements in Grain-Conveyers; and I do hereby declare that the following is a full, clear, and exact descripton of the invention, which will enable others skilled in the art to which it appertains to make and use the same.

This invention has reference to cross conveyers employed for the distribution of grain or other material in barns, cribs and the like; and combined therewith means for elevating such grain or other material to the said conveyer.

The object of the present invention is a conveyer-trough adapted to be secured in the upper portion of a barn or crib and extending substantially the entire length thereof, an elevator adapted to deliver the grain to said conveyer-trough at a point intermediate its ends, fixed conveyer mechanism coöperating with said conveyer-trough, and means for actuating said conveyer mechanism to cause the grain to travel in the conveyer-trough in either direction from the delivery spout of the elevator.

A further object of the invention is a conveyer-trough, fixed conveyer mechanism coöperating with said conveyer-trough, and a feed box slidably supported above the said conveyer-trough having a two-way chute for the purpose of discharging material from either end thereof, and means for actuating said conveyer mechanism to cause the material to travel in the conveyer-trough in opposite directions.

The invention has for its further object a fixed conveyer mechanism adapted to be supported in the top of a barn or crib and extending substantially the entire length thereof, means for delivering the grain to said conveyer mechanism at a point intermediate its ends, a slidably disposed feed box supported above the conveyer mechanism and beneath the feeding means, means for actuating said conveyer mechanism to cause the grain to travel in either direction from its point of delivery, and means for effecting the discharge of grain at various points along the conveyer mechanism.

For a further and full description of the invention herein and the merits thereof, and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings, in which:

Figure 1 is a longitudinal section of a barn or crib, showing the conveyer-trough and the conveyer mechanism for causing the grain to travel in either direction in said trough from its point of delivery; Fig. 2 is a detailed view in elevation showing the gearing for actuating the conveyer mechanism; Fig. 3 is a vertical cross section taken on the line x—x of Fig. 2; also showing in elevation the upper end of an elevator for elevating material to the conveyer-trough and the means of imparting power from the elevator to the gearing which actuates the conveyer mechanism; Fig. 4 is a detail view of the conveyer-trough and an adjustable chute employed in connection therewith for receiving and discharging the material at various points along the conveyer mechanism.

Like numerals of reference indicate corresponding parts throughout the figures.

In the drawings 1 denotes the upper portion of a barn or crib, adapted for the storage of grain.

2 denotes a conveyer-trough constructed with the sides 3 and the substantially flat bottom 4 composed of a series of sections or removable gates 5 having their adjacent ends supported by the transverse cleats 6. The conveyer-trough is designed to be secured or supported in the upper portion of the barn or crib 1 and extends substantially the entire length thereof, but terminates short of the ends of the said crib.

8 designates a feed box, which is of suitable length and constructed of the sides 9, the end walls 10, the intermediate wall or dividing partition 11 and the inclined bottom walls 12 which converge upwardly and meet at a point beneath the partition 11. The bottom walls 12 may be faced with sheet metal 13 as shown, if desired. The side walls 9 of the feed box 8 are supported and travel on the upper edges of the sides 3 of the conveyer-trough 2 and are adapted to travel between the uprights or supports 14 which extend up above the conveyer-trough and prevent lateral movement or displacement of the feed box during longitudinal movement and yet enables the feed box to be detached or removed from the feed trough. To enable the easy operation in shifting the feed box, I provide the same with the flange rollers 15 which travel on the longitudinal cleats 16 secured to the sides 3 of the conveyer-trough 2; the said rollers also serving to limit the longitudinal movement of the feed box by engagement with the uprights 14. The end walls 10 of the feed box 8 terminate short of the lower edges of the sides of the box, and the lower ends of the bottom walls 12 of the said feed box terminate short of the ends of the said sides 9 and together with the end walls 10 leave the lower open ends 17 at the opposite ends of the said box through which grain which is elevated and deposited in the feed box may find its way to the conveyer-trough beneath. The partition 11 serves to divide the feed box into the compartments 18 and 19 each of which have the sloping bottoms 13 on which any grain deposited into the compartments 18 and 19 will find its way to the conveyer-trough through the opening 17 as described. For the purpose of shifting the said feed box, I provide the ropes 20 which are secured to the end walls 10 thereof, and extend in opposite directions from the feed box to any point accessible to the hand of the operator.

21 designates an elevator, the delivery end of which projects through the side of the barn or crib and is adapted to deliver grain or other material to the feed box 8. This elevator may be of any suitable type and can be driven in any suitable manner. The upper end of the elevator is disposed relative to the conveyer-trough so as to discharge the material conveyed therein at a point intermediate the ends of the conveyer-trough; and the feed box 8 is of such a length and so adjusted relative to longitudinal movement that when the same is reciprocated in either direction by means of the ropes 20 it will bring one or the other of the compartments 18 or 19 of the feed box beneath the delivery end of the elevator, all of which it is believed is understood, and with a view of discharging the grain from the feed box to one side or the other of the center of the conveyer-trough.

The upper shaft of the elevator 21, herein indicated as 22 projects without the sides of the elevator casing and has keyed thereto sprocket wheels 23 for a purpose to be hereinafter more particularly set forth.

Grain deposited in the conveyer-trough 2 is caused to travel in either direction therein from its point of delivery by a pair of conveyers 24 and 25, which extend from the central point of the conveyer-trough to the opposite ends of the same and which are designed to be driven in different directions. Each of the conveyers 24 and 25 consist, preferably, of a pair of endless chains 26 connected at intervals by the flights 27. The upper stretches of the conveyers 24 and 25 are adapted to travel over the bottom 4 of the conveyer-trough 2, so that the flights 27 will cause the travel of any grain dumped in the trough. The upper stretches of the conveyers 24 and 25 are supported upon sprocket wheels 28 secured to or loosely carried on the shafts 29 journaled in bearings 30 adjustably attached to the sides 3 at the ends of the conveyer-trough 2, and sprocket wheels 31 secured to or loosely carried upon shafts 32 journaled in the sides of the conveyer-trough 2 and underlying the feed box 8. The portion of the bottom 4 of the conveyer-trough between the sprocket wheels 31, which support the inner ends of the conveyers 24 and 25, is cut away to permit the passage therethrough of said conveyers. The lower stretches of the conveyers 24 and 25 are supported upon sprocket wheels 33 carried by shafts 34, which are journaled in depending standards 35 secured to the sides 3 of the conveyer-trough 2 at the ends thereof, and the sprocket wheels 36 carried by the shafts 37 journaled in depending portions of the uprights heretofore referred to as 14. The lower ends of the parts 14 and 35 are connected by the transverse straps 38 to which are attached the longitudinally disposed beams 39 over which travel the flights 27 of the lower stretches of the conveyers. Referring again to the bearings 30 at the ends of the conveyer-trough in which the shafts 29 are journaled, the same are made adjustable on said trough so that the tension of the conveyer belts may be regulated. I accomplish this adjustment of the bearings 30 by providing elongated slots 41 (see Fig. 1) through which the shafts 29 are carried and also slot the bearings 30 as at 42 through which a bolt 43 is carried secured in the sides of the conveyer-trough. To the forward ends of the bearings 30, I connect one end of a threaded rod 44 which extends out through a plate or bracket 45 attached to the sides 3 of the conveyer-trough and provide the nuts 46 engaging a threaded end of the rod 44 by means of which the adjustment of the bearings 30 may be made.

The mechanism which I employ for actuating the conveyers 24 and 25 consists of the longitudinally disposed shaft 47 journaled in a bracket 48 secured to the sides of the conveyer-trough 4 and beneath the elevator 21. On the outer ends of the shaft 47 I provide the sprocket wheels 49 which are connected by chains 50 with the sprocket wheels 23 on the upper shaft 22 of the elevator 21, so that the shaft 47 will be continuously driven while the elevator is being operated. I prefer to provide the shaft 22 of the elevator with sprocket gears on each end thereof and likewise provide the sprocket gears 49 on the opposite ends of the shaft 47 and connect them with the driving chains 50; although only one side of the elevator is shown, (see Fig. 3), however, the shaft 47 is shown having the two gears and the connection of the chains between the gears 49 and 23 will be the same on either side of the elevator. I have provided for running the upper and lower stretches of the chains 50 between the gears 23 and 49 over the idler wheels 51 and 52 which are carried by the bracket 53 adjustably secured to the sides of the elevator, (see Fig. 3.)

Loosely mounted on the shaft 47 is a pair of beveled gears 54 and 55 which mesh with opposite sides of beveled gear wheels 56 and 57 secured to the outer ends of the driving shafts 31 of the conveyers 24 and 25, whereby the said conveyers will be driven in opposite directions when the gears 54 and 55 are clutched to the shaft 47. The shafts 31 which form the driving shafts of the conveyers 24 and 25 project through the sides of the conveyer-trough, and also through the bracket 48 above referred to. The gear wheels 54 and 55 have short sleeve extensions 58 provided with the clutch faces 59 and 60.

61 denotes a clutch-sleeve splined on the shaft 47 and is provided with clutch faces 62 and 63 adapted to engage, respectively, the clutch faces 59 and 60 on the beveled gears 54 and 55 to cause either of said wheels to rotate with the shaft 47. The clutch sleeve 61 is provided with an annular portion 64 which is adapted to be engaged by the bifurcated end 65 of an arm 66 to which is connected a lever 67 pivoted at 68 to the side of the conveyer-trough. The upper end of the lever 67 is carried adjacent to the outer face of one of the sides 9 of the feed box 8 and is adapted to be engaged by bracket 69 and 70 secured to the said feed box, whereby when the feed box is shifted one or the other of the brackets 69 or 70 will act on the lever 67 and shift the clutch sleeve 61 into engagement with either of the clutch faces of the sleeves of the gears 54 and 55.

Forming a continuation of the sloping bottoms 12 of the feed box 8 is a pair of hinged plates 71 carried on rods 72 secured in the opposite side of the conveyer-trough 2. The plates 71 overlie the bottoms 4 of the conveyer-trough with their ends resting upon the same and it is adapted as the flights of the conveyer chain pass beneath the same that they will raise the plates 71 sufficiently to allow them to pass. When the feed box has been shifted to its extreme limit in either direction the lower ends of the sloping bottoms 12 thereof will overlie and coincide with the upper portion of the plates 71, so that the plates 71 will form a continuation of the bottoms 12 and form a feed way from the feed box to the conveyers. A further advantage with a construction of this character is, that when elevating and conveying small grain there is little chance for leakage between the feed box and the conveyers 24 and 25.

I have not only provided for the discharge of grain at the opposite ends of the conveyer-trough, but have also provided means for discharging the grain from various points of the said conveyer-trough. It is aimed to make all or a series of the sections or gates 5 of the bottom 4 of the conveyer-trough removable or detachable therefrom. The sections 5 of the bottom as was above stated are supported on cleats 6, and normally close the openways between the said cleats. In practice the sections of the bottom are all first secured in position and the only discharge is at the end of the trough. As soon as the end of the barn is filled, however, the section of the bottom next adjacent the end or one in proximity thereto is removed, and so on until all or as many sections of the bottom as desired are removed. By this means the entire body of the barn or crib can be filled.

As a means of conducting the grain from the trough intermediate the ends thereof, when the sections of the bottom are removed, I have provided the detachable chute section 73, (see Fig. 4.), which is suspended beneath the chute by means of the hooked rods 74 which may be secured to the sides 3 of the conveyer-trough 2. To the chute 73 it is aimed to attach a swinging section 75 which is detachably connected to the chute section 73 by means of a strap 76 and a detachable pin 77 adapted to be inserted in one of several holes 78 of the sides of the section 73.

Assuming that the conveyer 24 and the elevator had been in operation for filling the right hand side of the barn or crib and it is desired to operate the conveyer 25 for filling the left hand side of the crib, the rope 20 connected with the right hand end of the feed box will be operated to reciprocate the feed box which will cause the bracket 70 thereon to engage the lever 67 and shift the clutch sleeve 61 on the shaft 47 to cause it to engage the clutch member of the gear 54 which will set into motion the shaft 31 of the conveyer 25 through the gear 56 and drive the said conveyer to the left. This operation of shifting the feed box brings the lower end of the bottom 12 of the compartment 19 of the feed box beneath the elevator and above the swinging plate 71, whereby all material discharged from the elevator will find its way through the compartment 19 of the feed box 8 to the conveyer 25. Reversing the movements of the parts just described will place the feed box and the driving mechanism in the position seen in the drawing.

It will be understood that the elevator shaft 22 and the conveyer-trough shaft 47 are operated continuously and shifting the feed box its extreme limit to one side or the other will simultaneously operate the conveyer over which the feed box has been shifted for the purpose of feeding grain thereto.

Referring to the elevator 21 and particularly the shaft 22 thereof the same is journaled in adjustable bearings 79, which are in all respects similar to those shown at 30 on the ends of the conveyer-trough. I have also provided the discharge spout of the elevator with a hood 80, see Fig. 3, and the office of the same is to guard the discharge of the material from the elevator and insure the deposit of the same in the feed-box.

I am aware that appuratuses of this character have been used; that is to say, conveyers have been disposed in the upper portion of a barn or crib where an elevator has delivered the grain to one end thereof and the conveyer has not only conveyed the material received from the elevator to the opposite end thereof, but it has also been provided to discharge the grain at points intermediate the ends of the conveyer.

I am also aware of an apparatus where the grain is delivered at a central point and it has been proposed to install a shiftable conveyer in the upper portion of the barn or crib for the purpose of filling the entire interior of said barn or crib. In this last form the conveyer is first placed with one of its ends adjacent the delivery end of the means used to elevate the grain and its other end adjacent to one end of the barn. The conveyer is then actuated to cause the grain to travel from the delivery end of the elevator toward the end of the barn, and this movement of the conveyer is continued until one-half of the barn or crib has been filled with the grain. The conveyer is then shifted to the opposite end of the barn and the operation repeated. A construction of this character requires a great deal of complicated mechanism for shifting the conveyer, and it is to overcome this objection that the present invention has been designed, which broadly stated, contemplates the use of a fixed conveyer mechanism supported in the top of a barn or crib and extending substantially the entire length thereof, means for delivering the grain to said conveyer mechanism at a point intermediate its ends, and means for actuating said conveyer mechanism to cause the grain to travel in either direction from its point of delivery, and means for effecting the discharge of grain at various points along the conveyer mechanism.

Having thus fully described my invention, what I claim and desire to secure by Letters Patent of the United States is:—

1. In an apparatus of the character described, a pair of conveyers secured in the upper portion of a barn or crib and adapted to be driven in opposite directions, an elevator, a slidably supported feed-box adapted to connect the delivery spout of the elevator with either of said conveyers, means for operating said feed-box, and means actuated by the feed-box for causing the conveyer connected to the delivery spout of the elevator to run with the elevator.

2. In an apparatus of the character described, a conveyer-trough secured in the upper portion of a barn or crib, a pair of conveyers associated with said trough and adapted to be driven in different directions, an elevator, a movably supported feed-box adapted to connect the delivery spout of the elevator with either of said conveyers, means for operating said feed-box, and means actuated by the said feed-box for causing the conveyer connected with the elevator spout to run with the elevator.

3. In an apparatus of the character described, a conveyer-trough, a pair of endless conveyers arranged end to end in said trough, means for driving said conveyers independently in different directions, an elevator, a feed-box slidably supported above the adjacent ends of said conveyers, said feed-box divided into two compartments and adapted to connect the delivery spout of the elevator with either of said conveyers, and means for moving the feed-box.

4. In an apparatus of the character described, a conveyer-trough, a pair of endless conveyers arranged end to end in said trough, means for driving said conveyers independently in different directions, an elevator, a feed-box slidably supported above the adjacent ends of said conveyers, said feed-box divided into two compartments and adapted to connect the delivery spout of the elevator with either of said conveyers, means for operating the feed-box, and pivotally supported plates in said conveyer-trough intermediate the feed-box and the inner ends of the conveyers aforesaid.

5. In an apparatus of the character described, a conveyer-trough, a pair of endless conveyers arranged end to end in said trough, means for driving said conveyers independently in different directions, an elevator, a feed-box mounted for reciprocation above the adjacent ends of said conveyers, wheels at the four corners of the feed-box and tracks for the said wheels attached to the conveyer trough, the said feed-box divided into two compartments and adapted to connect the delivery spout of the elevator with either of said conveyers, and means for moving the feed-box.

6. In an apparatus of the character described, a conveyer-trough, a pair of endless conveyers arranged end to end in said trough, means for driving said conveyers independently in different directions, an elevator, a feed-box mounted for reciprocation above the inner ends of said conveyers, means for reciprocating said feed-box and means for limiting the movement thereof, a dividing partition in said feed-box, diverging bottom walls leading from the partition in the feed-box, and a pair of hinged plates, one above the inner ends of each of the said conveyers, the said hinged plates adapted to form a continuation of the diverging walls of the feed-box when the said feed-box reaches the end of its movement in either direction.

In testimony whereof I affix my signature, in presence of two witnesses.

ERNST H. SCHROEDER.

Witnesses:
   T. F. BUEHRIG,
   VALENTIN IMIGSEN.